United States Patent
Chen et al.

(10) Patent No.: US 8,020,012 B2
(45) Date of Patent: Sep. 13, 2011

(54) POWER AUTO-DETECTION APPARATUS

(75) Inventors: Fu-Sung Chen, Taipei Hsien (TW);
Ming-Ho Huang, Taipei Hsien (TW)

(73) Assignee: Chicony Power Technology Co., Ltd., Taipei (TW)

( * ) Notice: Subject to any disclaimer, the term of this patent is extended or adjusted under 35 U.S.C. 154(b) by 494 days.

(21) Appl. No.: 12/356,138

(22) Filed: Jan. 20, 2009

(65) Prior Publication Data

US 2010/0127686 A1 May 27, 2010

(30) Foreign Application Priority Data

Nov. 26, 2008 (TW) .............................. 97221158 U

(51) Int. Cl.
*G06F 1/26* (2006.01)
*G05F 1/00* (2006.01)
(52) U.S. Cl. ........................................ 713/300; 323/298
(58) Field of Classification Search .................... 713/300
See application file for complete search history.

(56) References Cited

U.S. PATENT DOCUMENTS

| | | | | |
|---|---|---|---|---|
| 6,005,789 A * | 12/1999 | Lee | .................................. | 363/95 |
| 7,518,836 B2 * | 4/2009 | Kim et al. | ........................ | 361/18 |
| 7,697,309 B2 * | 4/2010 | Bao et al. | .................... | 363/56.11 |
| 2006/0209481 A1 * | 9/2006 | Kim et al. | ........................ | 361/92 |
| 2007/0171688 A1 * | 7/2007 | Bao et al. | .................... | 363/56.09 |
| 2007/0195558 A1 * | 8/2007 | Kim et al. | .................... | 363/21.01 |
| 2008/0012541 A1 * | 1/2008 | Sasaki et al. | .................... | 323/265 |

* cited by examiner

*Primary Examiner* — Ryan Stiglic
(74) *Attorney, Agent, or Firm* — Chun-Ming Shih; HDLS IPR Services

(57) ABSTRACT

A power auto-detection apparatus is applied to a power supply of a personal computer or applied to an adapter of a notebook computer. The power auto-detection apparatus has a voltage stabilizing unit, an over-current protective unit, a voltage regulating unit, a signal processing unit, and a regulating resistor. The over-current protective unit provides an over-current protection for the power auto-detection apparatus. The voltage regulating unit electrically connects to a non-ground terminal of the regulating resistor and outputs a first regulating voltage and a second regulating voltage. The signal processing unit electrically connects the voltage regulating unit and receives the second regulating voltage to output a power detection signal to the computer system to automatically detect the output power of the power supply or the adapter.

16 Claims, 4 Drawing Sheets

POWER AUTO-DETECTION APPARATUS

BACKGROUND OF THE INVENTION

1. Field of the Invention

The present invention relates to a power detection apparatus, and more particularly to a power detection apparatus which provides a power auto-detection for a power supply or an adapter by adjusting a regulating resistor or an adjustable feedback resistor.

2. Description of Prior Art

Under the aspect of sustaining developments in order to achieve the harmony state of environment protection and energy consumption, the issue of energy has become even more seriously and widely discussed in many countries. Therefore, energy saving becomes the main purpose to secure world energy supplies. Also, a power management system is applied to various life demands to increase efficiency of power utilization to develop maximum energy saving benefit.

However, the states of the operation power (a full-load state, a half-load state, or a light-load state) cannot be clearly distinguished if the power management system operates inappropriately. As a result, the system performance and power efficiency decreases.

With the development of personal computers and notebook computers, therefore, popularization of energy saving for the computer system is significantly demanded to increase efficiency of power utilization by the improved power management system.

SUMMARY OF THE INVENTION

Accordingly, a primary object of the present invention is to detect automatically output power for a power supply of a personal computer or for an adapter of a notebook computer by adjusting a regulating resistor or an adjustable feedback resistor.

In order to achieve the objective mentioned above, the prevent invention provides a power auto-detection apparatus, and the power auto-detection apparatus is applied to a power supply of a personal computer or applied to an adapter of a notebook computer. The power auto-detection apparatus comprises a voltage stabilizing unit, an over-current protective unit, a voltage regulating unit, a signal processing unit, and a regulating resistor.

The voltage stabilizing unit receives a first voltage and an input current to output an output voltage. The over-current protective unit receives a second voltage and the input current to provide an over-current protection for the power auto-detection apparatus. The regulating resistor has a ground terminal and a non-ground terminal, and the first current is determined by regulating the regulating resistor. The voltage regulating unit is electrically connected to the non-ground terminal of the regulating resistor, and outputting a first regulating voltage and a second regulating voltage according to the first current. The signal processing unit is electrically connected to the voltage regulating unit and receives the second voltage, and further receiving the second regulating voltage to output a power detection signal to the personal computer or the notebook computer.

In order to achieve the objective mentioned above, the prevent invention provides a power auto-detection apparatus, and the power auto-detection apparatus is applied to a power supply of a personal computer or applied to an adapter of a notebook computer. The power auto-detection apparatus comprises a voltage stabilizing unit, an over-current protective unit, a voltage amplifying unit, a signal processing unit, and a regulating resistor.

The voltage stabilizing unit receives a first voltage and an input current to output an output voltage. The over-current protective unit receives a first fixed voltage and the input current to provide an over-current protection for the power auto-detection apparatus. The regulating resistor has a ground terminal and a non-ground terminal. The voltage amplifying unit is a non-inverting operational amplifier, and which is composed of a feedback capacity, an adjustable feedback resistor, and the regulating resistor. The voltage amplifying unit is electrically connected to the non-ground terminal of the regulating resistor, and the regulating resistor or the adjustable feedback resistor can be regulated to output a gain output voltage. The signal processing unit is electrically connected to the voltage amplifying unit and receives a second fixed voltage to output a power detection signal to the personal computer or the notebook computer.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
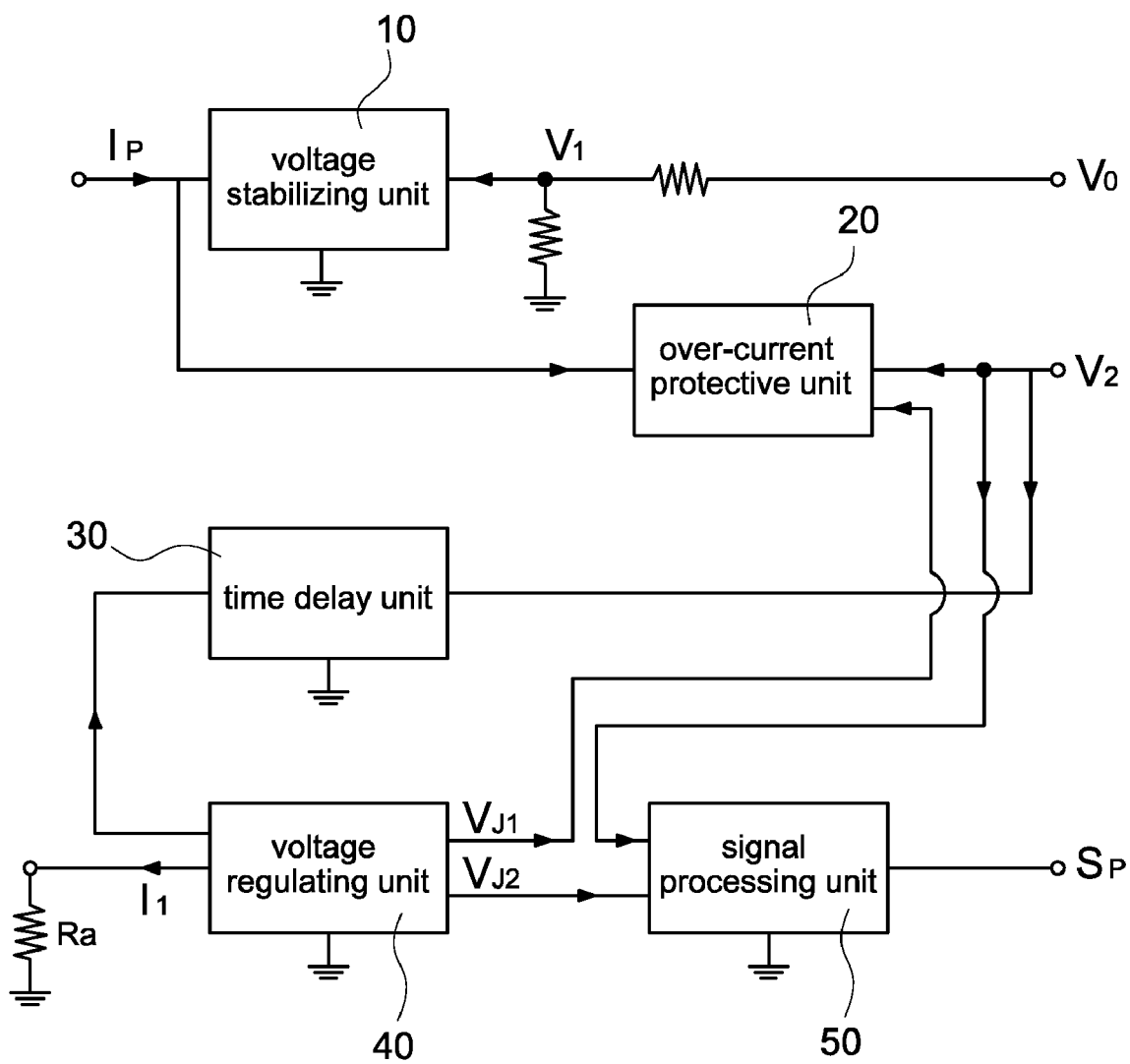
FIG. 1 is a block diagram of a first embodiment of a power auto-detection apparatus according to the present invention.

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Reference will now be made to the drawing figures to describe the present invention in detail.

Reference is made to FIG. 1 which is a block diagram of a first embodiment of a power auto-detection apparatus according to the present invention. The power auto-detection apparatus 9 is applied to a power supply of a personal computer or applied to an adapter of a notebook computer. The power auto-detection apparatus 9 comprises a voltage stabilizing unit 10, an over-current protective unit 20, a regulating resistor Ra, a voltage regulating unit 40, and a signal processing unit 50. The voltage stabilizing unit 10 receives a first voltage V1 and an input current Ip to outputs an output voltage Vo, where the output voltage Vo is generated by dividing the first voltage V1 by the voltage stabilizing unit 10 via a plurality of resistors (not labeled). The input current Ip is produced by driving a photo coupler (not shown) by the output voltage Vo. The voltage stabilizing unit 10 can be a KA431 component or other equivalent voltage stabilizing components. The over-current protective unit 20 receives a second voltage V2 and the input current Ip to provide an over-current protection for the power auto-detection apparatus 9. The regulating resistor Ra has a ground terminal and a non-ground terminal, and the first current Ip is determined by regulating the regulating resistor Ra. The voltage regulating unit 40 is electrically connected to the non-ground terminal of the regulating resistor Ra, and outputting a first regulating voltage Vj1 and a second regulating voltage Vj2 according to the first current I1. The signal processing unit 50 is electrically connected to the voltage regulating unit 40 and receives the second voltage V2, and further receiving the second regulating voltage Vj2 to output a power detection signal Sp to the personal computer or the notebook computer. The power detection signal Sp is at a low-voltage signal level when the detected output power is smaller than a threshold power; and the power detection signal Sp is at a high-voltage signal level when the detected output power reaches the threshold power. When the over-current protection is performed, the input current Ip is shorted to ground by the over-current protective unit 20 to drive the adapter to perform the over-current protection for the power auto-detection apparatus 9. The second voltage V2 and the second regulating voltage Vj2 are compared by the signal processing unit 50 to automatically detect the power detection signal Sp that is at a low-voltage signal level or at a high-voltage signal level to be outputted to the computer system. In addition, the power auto-detection apparatus 9 further comprises a time delay unit 30, and the time delay unit 30 which is electrically connected to the voltage regulating unit 40. The time delay unit 30 provides a time delay process to compensate a phase lead caused due to an effect of a capacity charge for the second voltage V2. The effect of the capacity charge induces a great short current to exceed a rated current to fail to operate the power auto-detection apparatus 9.

Figure 2:
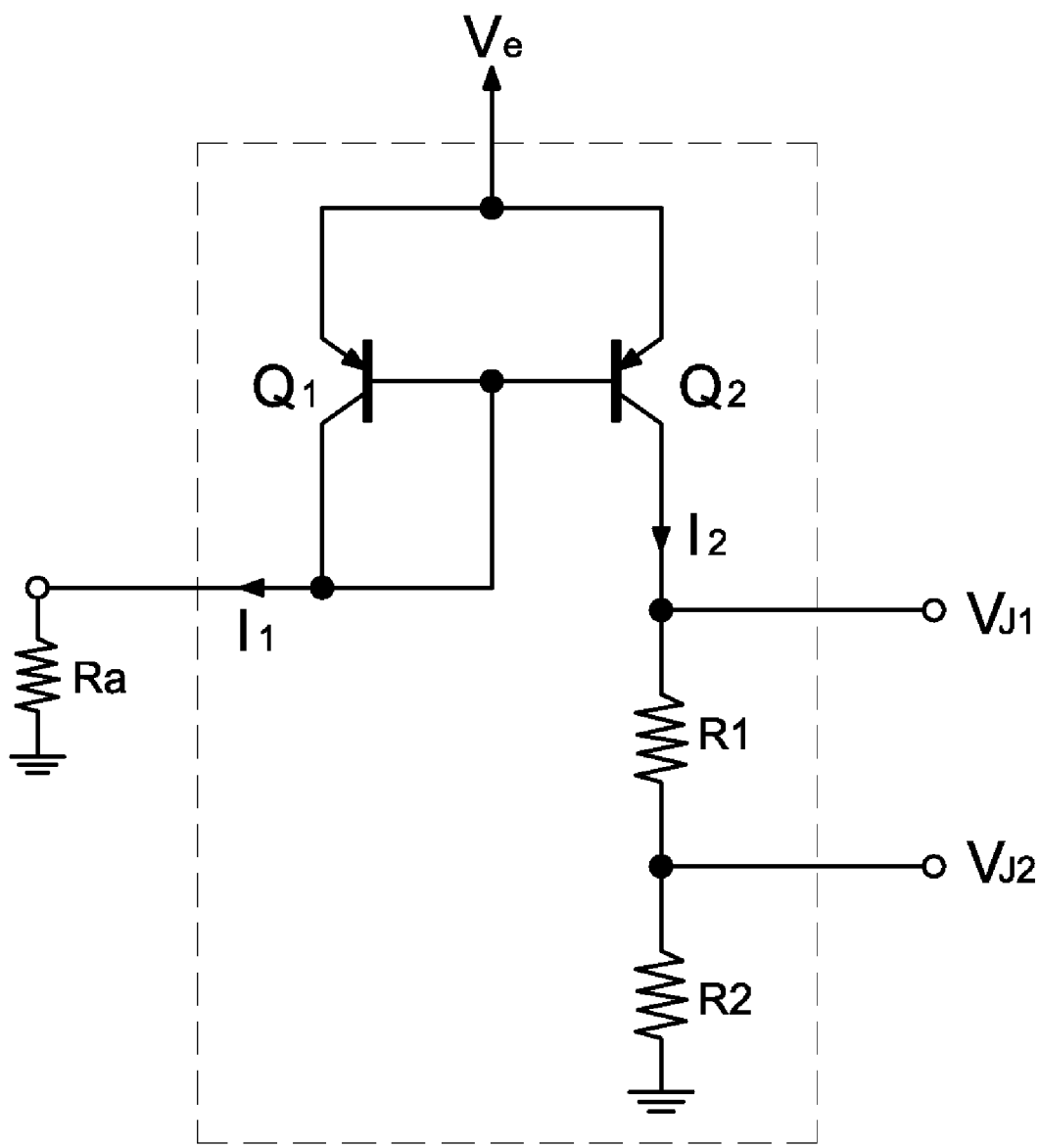
FIG. 2 is a circuit diagram of the first embodiment of a voltage regulating unit.

Reference is made to FIG. 2 which is a circuit diagram of the first embodiment of a voltage regulating unit. The voltage regulating unit 40 is a current mirror unit. The current mirror unit is composed of a first transistor Q1, a second transistor Q2, a first resistor R1, and a second resistor R2. Both the first transistor Q1 and the second transistor Q2 can be a bipolar junction transistor (BJT) or a metal-oxide-semiconductor field-effect transistor (MOSFET), or other equivalent components. The current mirror unit is electrically connected to a constant voltage Ve, and the constant voltage Ve and the regulating resistor Ra (shown in FIG. 1) are regulated to determine a first current I1 and a second current I2. Also, the first current I1 is equal to the second current I2. The second current I2 passes through the first resistor R1 and the second resistor R2 to produce a first regulating voltage Vj1 and a second regulating voltage Vj2, respectively. The detailed description of the first regulating voltage Vj1 and the second regulating voltage Vj2 is illustrated as above FIG. 1.

Figure 3:
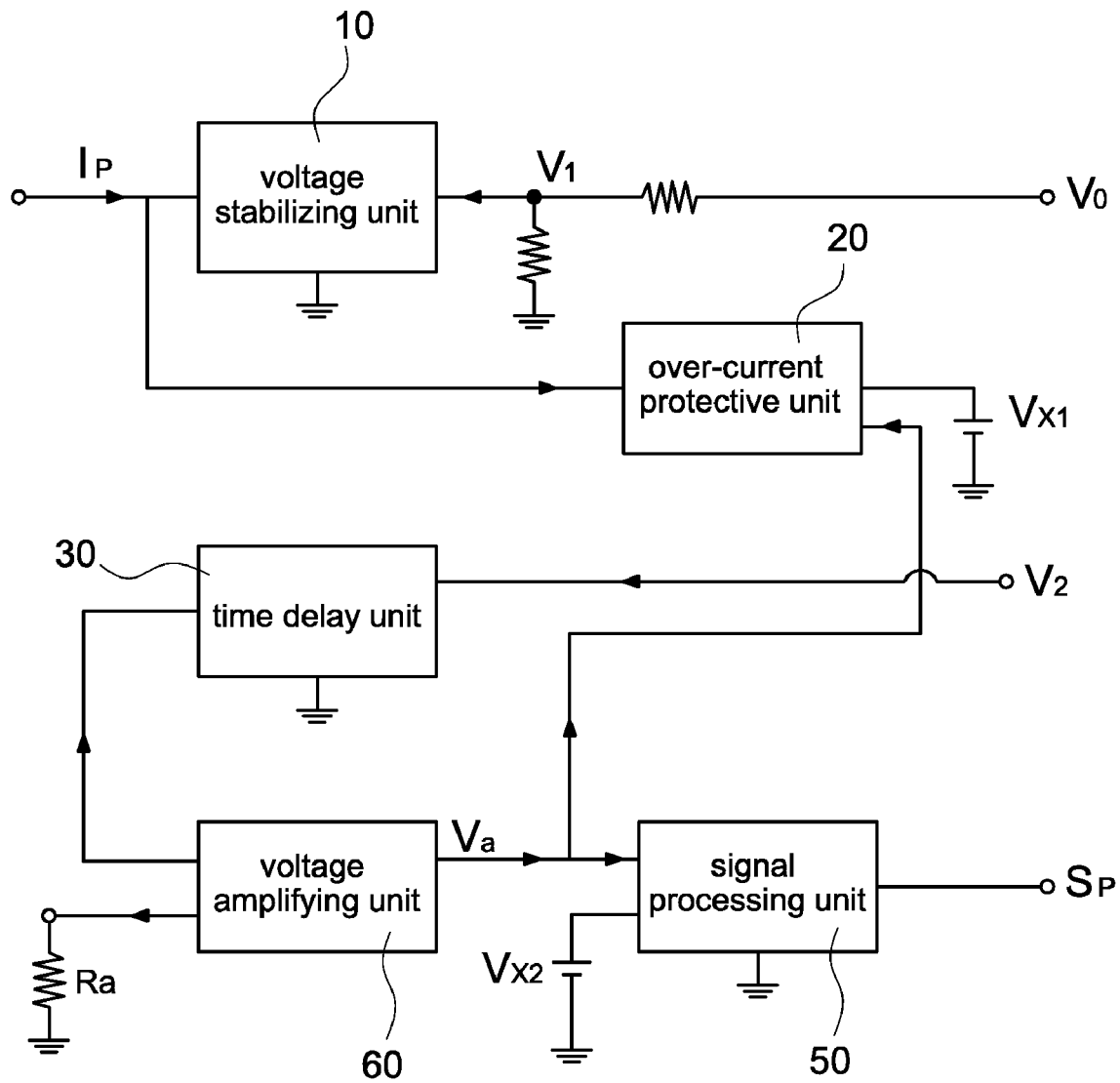
FIG. 3 is a block diagram of a second embodiment of a power auto-detection apparatus.

Reference is made to FIG. 3 which is a block diagram of a second embodiment of a power auto-detection apparatus. The power auto-detection apparatus 9 is applied to a power supply of a personal computer or applied to an adapter of a notebook computer. The power auto-detection apparatus 9 comprises a voltage stabilizing unit 10, an over-current protective unit 20, a regulating resistor Ra, a voltage amplifying unit 60, and a signal processing unit 50. The voltage stabilizing unit 10 receives a first voltage V1 and an input current Ip. Also, an output voltage Vo is outputted by dividing the first voltage V1 via a plurality of resistors (not labeled). The input current Ip is produced by driving a photo coupler (not shown) by the output voltage Vo. The voltage stabilizing unit 10 can be a KA431 component or other equivalent voltage stabilizing components. The over-current protective unit 20 receives a first fixed voltage Vx1 and the input current Ip to provide an over-current protection for the power auto-detection apparatus 9. The voltage amplifying unit 60 is a non-inverting operational amplifier, and which is composed of a feedback capacity Cf, an adjustable feedback resistor Rf, and the regulating resistor Ra. The regulating resistor Ra has a ground terminal and a non-ground terminal. The voltage amplifying unit 60 is electrically connected to the non-ground terminal of the regulating resistor Ra, and the regulating resistor Ra or the adjustable feedback resistor Rf can be regulated to output a gain output voltage Va. The signal processing unit 50 is electrically connected to the voltage amplifying unit 60 and receives a second fixed voltage Vx2 to output a power detection signal Sp to the personal computer or the notebook computer. The power detection signal Sp is at a low-voltage signal level when the detected output power is smaller than a threshold power; and the power detection signal Sp is at a high-voltage signal level when the detected output power reaches the threshold power. When the over-current protection is performed, the input current Ip is shorted to ground by the over-current protective unit 20 to drive the adapter to perform the over-current protection for the power auto-detection apparatus 9. In addition, the power auto-detection apparatus 9 further comprises a time delay unit 30 electrically connected to the voltage amplifying unit 60. The time delay unit 30 provides a time delay process to compensate a phase lead caused due to an effect of a capacity charge for the second voltage V2. The effect of the capacity charge induces a great short current to exceed a rated current to fail to operate the power auto-detection apparatus 9.

Figure 4:
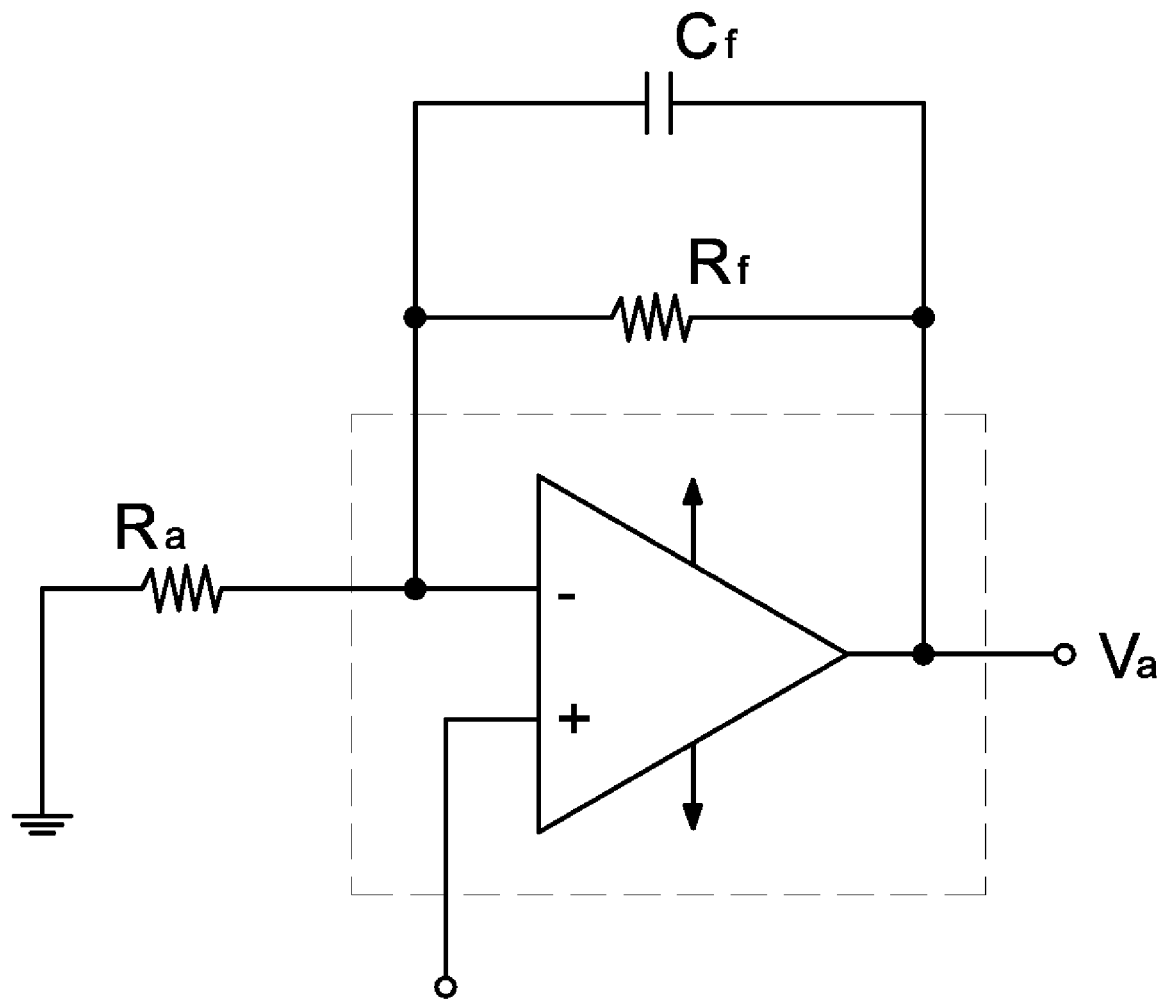
FIG. 4 is a circuit diagram of the second embodiment of a voltage regulating unit.

Reference is made to FIG. 4 which is a circuit diagram of the second embodiment of a voltage regulating unit. The voltage amplifying unit 60 is a non-inverting operational amplifier, and which is composed of a feedback capacity Cf, an adjustable feedback resistor Rf, and the regulating resistor Ra. The feedback capacity Cf is connected parallel to the adjustable feedback resistor Rf to avoid a large low-frequency gain of the voltage amplifying unit 60. Also, the gain output voltage Va is determined by regulating the adjustable feedback resistor Rf or the regulating resistor Ra. The detailed description of the gain output voltage Va is illustrated as above FIG. 3.

In conclusion, the present invention has the following advantages:

1. Using only one regulating resistor or one adjustable feedback resistor can adjust operation voltages of both the over-current protective unit and the signal processing unit to perform the over-current protection and the power auto-detection, respectively.

2. The voltage stabilizing unit and the over-current protective unit are both built-in the power auto-detection apparatus to simplify an inner circuit of the power supply or the adapter.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power auto-detection apparatus applied to a power supply of a personal computer or applied to an adapter of a notebook computer, the apparatus comprising:
   a voltage stabilizing unit receiving a first voltage and an input current to provide an output voltage;
   an over-current protective unit receiving a second voltage and the input current to provide an over-current protection for the power auto-detection apparatus;
   a regulating resistor having a ground terminal and a non-ground terminal, and adjusted to determine a first current;
   a voltage regulating unit electrically connected to the non-ground terminal of the regulating resistor, and outputting a first regulating voltage and a second regulating voltage according to the first current; and
   a signal processing unit electrically connected to the voltage regulating unit and receiving the second voltage, and further receiving the second regulating voltage to output a power detection signal to the personal computer or the notebook computer.

2. The power auto-detection apparatus in claim 1, wherein the over-current protective unit is configured to compare the second voltage with the first regulating voltage, and take the input current into account to provide an over-current protection for the power auto-detection apparatus.

3. The power auto-detection apparatus in claim 1, wherein the power detection signal is at a low-voltage signal level when the detected output power is smaller than a threshold power; and the power detection signal is at a high-voltage signal level when the detected output power reaches the threshold power.

4. The power auto-detection apparatus in claim 1, further comprising a time delay unit electrically connected to the voltage regulating unit and configured to provide a time delay process to compensate a phase lead caused due to an effect of a capacity charge for the second voltage.

5. The power auto-detection apparatus in claim 1, wherein the output voltage is generated by dividing the first voltage by the voltage stabilizing unit via a plurality of resistors.

6. The power auto-detection apparatus in claim 1, wherein the input current is produced by driving a photo coupler by the output voltage.

7. The power auto-detection apparatus in claim 1, wherein the voltage regulating unit is a current mirror circuit.

8. The power auto-detection apparatus in claim 1, wherein the voltage stabilizing unit is a KA431 component.

9. A power auto-detection apparatus applied to a power supply of or a personal computer or applied to an adapter of a notebook computer, the apparatus comprising:
   a voltage stabilizing unit receiving a first voltage and an input current to provide an output voltage;
   an over-current protective unit receiving a first fixed voltage and the input current to provide an over-current protection for the power auto-detection apparatus;
   a regulating resistor having a ground terminal and a non-ground terminal;
   a voltage amplifying unit electrically connected to the non-ground terminal of the regulating resistor, and providing an adjustable feedback resistor to output a gain output voltage by adjusting the regulating resistor or the adjustable feedback resistor; and
   a signal processing unit electrically connected to the voltage regulating unit and receiving a second fixed voltage to output a power detection signal to the personal computer or the notebook computer.

10. The power auto-detection apparatus in claim 9, wherein the over-current protective unit is adapted to compare the second voltage with the first regulating voltage, and take the input current into account to provide an over-current protection for the power auto-detection apparatus.

11. The power auto-detection apparatus in claim 9, wherein the power detection signal is at a low-voltage signal level when the detected output power is smaller than a threshold power, on the contrary, the power detection signal is at a high-voltage signal level when the detected output power reaches the threshold power.

12. The power auto-detection apparatus in claim 9, further comprising a time delay unit electrically connected to the voltage regulating unit and configured to provide a time delay process to compensate a phase lead caused due to an effect of a capacity charge for the second voltage.

13. The power auto-detection apparatus in claim 9, wherein the output voltage is generated by dividing the first voltage by the voltage stabilizing unit via a plurality of resistors.

14. The power auto-detection apparatus in claim 9, wherein the input current is produced by driving a photo coupler by the output voltage.

15. The power auto-detection apparatus in claim 9, wherein the voltage amplifying unit is an operational amplifier.

16. The power auto-detection apparatus in claim 9, wherein the voltage stabilizing unit is a KA431 component.

* * * * *